(12) United States Patent
Kramer et al.

(10) Patent No.: US 7,169,265 B1
(45) Date of Patent: *Jan. 30, 2007

(54) METHOD FOR MANUFACTURING RESIN-IMPREGNATED ENDLESS BELT AND A BELT FOR PAPERMAKING MACHINES AND SIMILAR INDUSTRIAL APPLICATIONS

(75) Inventors: Charles E. Kramer, Walpole, MA (US); Joseph G. O'Connor, Hopedale, MA (US); Maurice Paquin, Plainville, MA (US)

(73) Assignee: Albany International Corp., Albany, NY (US)

( * ) Notice: Subject to any disclaimer, the term of this patent is extended or adjusted under 35 U.S.C. 154(b) by 643 days.

This patent is subject to a terminal disclaimer.

(21) Appl. No.: 10/334,210

(22) Filed: Dec. 31, 2002

(51) Int. Cl.
*D21F 3/02* (2006.01)
*B05D 5/00* (2006.01)
*B05D 1/00* (2006.01)
*B32B 27/04* (2006.01)

(52) U.S. Cl. ............. 162/358.4; 162/901; 428/195.1; 428/196; 428/308.4; 428/314.2; 442/59; 427/195; 427/261; 427/288; 427/389.9

(58) Field of Classification Search ........ 162/203–207, 162/306, 348, 358.2, 358.4, 900–904, 109–117, 162/360–361; 156/459, 460; 428/192–194, 428/195.1, 198, 200, 206, 212, 213, 220, 428/143, 147, 131, 304.4, 308.4, 314.2; 442/59, 442/76, 148; 474/266–268; 427/9, 447, 427/448, 466, 470, 487, 492, 508–510, 513, 427/140, 176, 189, 195, 196, 201, 203, 209, 427/210, 244, 258, 261, 265, 285, 288, 331, 427/355, 370, 372.2, 384, 389.9, 394; 430/18, 430/322
See application file for complete search history.

(56) References Cited

U.S. PATENT DOCUMENTS 3,042,568 A     7/1962   Ludowici et al. ........... 156/137

(Continued)

FOREIGN PATENT DOCUMENTS

DE     196 51 557     6/1998

(Continued)

OTHER PUBLICATIONS

S. Ashley, Rapid Prototyping Systems, *Mechanical Engineering*, Apr. 1991, pp. 34-43.

*Primary Examiner*—Eric Hug
(74) *Attorney, Agent, or Firm*—Frommer Lawrence & Haug LLP; Ronald R. Santucci

(57) ABSTRACT

A method for manufacturing resin-impregnated endless belt structures and belt structures designed for use on a long nip press on a papermaking machine and for other papermaking and paper processing applications, requires the application of a sacrificial material onto a base substrate in a predetermined pattern in droplets having an average diameter of 10μ (10 microns) or more. Polymeric resin material is then deposited on the base substrate to cover all areas except those on which the sacrificial material has been previously applied. The polymeric resin material is then set by means appropriate to its composition, and the sacrificial material removed. Optionally, the polymeric resin material may then be abraded to provide the belt with a uniform thickness, and a smooth, macroscopically monoplanar surface.

74 Claims, 7 Drawing Sheets

U.S. PATENT DOCUMENTS

| | | | |
|---|---|---|---|
| 3,149,003 A | 9/1964 | Christie et al. | |
| 3,175,792 A | 3/1965 | Smallian | 245/8 |
| 3,350,260 A | 10/1967 | Johnson | 162/116 |
| 3,501,366 A | 3/1970 | Bramley et al. | |
| 3,549,742 A | 12/1970 | Benz | |
| 3,613,258 A | 10/1971 | Jamieson | 34/95 |
| 3,673,023 A | 6/1972 | Ross | 156/137 |
| 3,720,578 A | 3/1973 | Heling et al. | |
| 3,994,662 A | 11/1976 | Bramley | |
| 4,109,543 A | 8/1978 | Foti | 74/231 |
| 4,111,634 A | 9/1978 | Limbach et al. | |
| 4,187,618 A | 2/1980 | Diehl | 34/243 |
| 4,191,609 A | 3/1980 | Trokhan | 162/113 |
| 4,239,065 A | 12/1980 | Trokhan | 139/383 |
| 4,251,928 A | 2/1981 | Rotar et al. | 34/116 |
| 4,300,982 A | 11/1981 | Romanski | 162/358 |
| 4,312,009 A | 1/1982 | Lange | 346/140 |
| 4,382,987 A | 5/1983 | Smart | 428/212 |
| 4,383,495 A | 5/1983 | Plichta et al. | 118/406 |
| 4,427,734 A | 1/1984 | Johnson | 428/234 |
| 4,482,430 A | 11/1984 | Majaniemi | 162/358 |
| 4,514,345 A * | 4/1985 | Johnson et al. | 264/425 |
| 4,528,239 A | 7/1985 | Trokhan | 428/247 |
| 4,529,480 A | 7/1985 | Trokhan | 162/109 |
| 4,567,077 A | 1/1986 | Gauthier | 428/114 |
| 4,571,798 A | 2/1986 | Adams | |
| 4,637,859 A | 1/1987 | Trokhan | 162/109 |
| 4,752,519 A | 6/1988 | Boyer et al. | |
| 4,917,937 A | 4/1990 | Lappanen et al. | |
| 4,981,745 A | 1/1991 | Lefkowitz | 428/147 |
| 5,066,532 A | 11/1991 | Gaisser | 428/137 |
| 5,084,326 A | 1/1992 | Vohringer | |
| 5,121,329 A | 6/1992 | Crump | 364/468 |
| 5,136,515 A | 8/1992 | Helinski | 364/468 |
| 5,238,537 A | 8/1993 | Dutt | 162/358.4 |
| 5,240,531 A | 8/1993 | Toda et al. | 156/137 |
| 5,277,761 A | 1/1994 | Van Phan et al. | 162/109 |
| 5,292,438 A | 3/1994 | Lee | |
| 5,298,124 A | 3/1994 | Eklund et al. | 162/306 |
| 5,360,656 A | 11/1994 | Rexfelt et al. | 428/193 |
| 5,397,438 A | 3/1995 | Nyberg et al. | 162/207 |
| 5,422,166 A | 6/1995 | Fleischer | |
| 5,462,642 A | 10/1995 | Kajander | 162/116 |
| 5,506,607 A | 4/1996 | Sanders, Jr. et al. | 347/1 |
| 5,515,779 A | 5/1996 | Danby | |
| 5,518,680 A | 5/1996 | Cima et al. | |
| 5,556,509 A | 9/1996 | Trokhan et al. | 162/111 |
| 5,672,248 A | 9/1997 | Wendt et al. | 162/109 |
| 5,679,222 A | 10/1997 | Rasch et al. | 162/358.1 |
| 5,713,399 A | 2/1998 | Collette et al. | 139/383 |
| 5,714,041 A * | 2/1998 | Ayers et al. | 162/111 |
| 5,731,059 A | 3/1998 | Smith et al. | 428/192 |
| 5,733,608 A | 3/1998 | Kessel et al. | 427/547 |
| 5,740,051 A | 4/1998 | Sanders, Jr. et al. | 364/468.26 |
| 5,746,887 A | 5/1998 | Wendt et al. | 162/109 |
| 5,787,602 A | 8/1998 | Hsu et al. | 34/116 |
| 5,804,036 A | 9/1998 | Phan et al. | |
| 5,817,374 A | 10/1998 | Detig et al. | 427/466 |
| 5,817,377 A | 10/1998 | Trokhan et al. | |
| 5,829,488 A | 11/1998 | Fagerholm et al. | 139/383 |
| 5,849,395 A | 12/1998 | Valentine et al. | |
| 5,936,861 A | 8/1999 | Jang et al. | 364/468.04 |
| 6,080,691 A | 6/2000 | Lindsay et al. | 442/381 |
| 6,099,781 A | 8/2000 | Ampulski | |
| 6,120,642 A | 9/2000 | Lindsay et al. | 162/109 |
| 6,136,151 A | 10/2000 | Davenport et al. | 162/306 |
| 6,136,157 A | 10/2000 | Lindeberg et al. | 204/157.6 |
| 6,193,847 B1 | 2/2001 | Trokhan | |
| 6,251,331 B1 | 6/2001 | Ampulski | 264/510 |
| 6,340,413 B1 | 1/2002 | Nilsson et al. | 162/361 |
| 6,344,241 B1 * | 2/2002 | Ampulski | 427/286 |
| 6,350,336 B1 | 2/2002 | Paquin | 156/93 |
| 6,358,030 B1 | 3/2002 | Ampulski | |
| 6,358,594 B1 | 3/2002 | Ampulski | |
| 6,398,910 B1 | 6/2002 | Burazin et al. | |
| 6,419,795 B1 | 7/2002 | Dutt | |
| 6,576,090 B1 * | 6/2003 | Trokhan et al. | 162/348 |
| 2001/0035598 A1 | 11/2001 | Ampulski | |
| 2002/0107495 A1 | 8/2002 | Chen et al. | |

FOREIGN PATENT DOCUMENTS

| | | |
|---|---|---|
| EP | 0 487 477 | 5/1992 |
| EP | 0 568 509 | 11/1993 |
| EP | 0 613 729 | 9/1994 |
| EP | 0 677 612 A2 | 10/1995 |
| GB | 1 053 282 | 5/1963 |
| WO | WO 92/00415 | 1/1992 |
| WO | WO 93/00474 | 1/1993 |
| WO | WO 96/35018 | 11/1996 |
| WO | WO 97/14846 | 4/1997 |
| WO | WO 99/35332 | 7/1999 |
| WO | WO 00/09308 | 2/2000 |
| WO | WO 02/088464 A1 | 11/2002 |
| WO | WO 2004/045834 A1 | 6/2004 |

* cited by examiner

METHOD FOR MANUFACTURING RESIN-IMPREGNATED ENDLESS BELT AND A BELT FOR PAPERMAKING MACHINES AND SIMILAR INDUSTRIAL APPLICATIONS

BACKGROUND OF THE INVENTION

1. Field of the Invention

The present invention relates, in part, to mechanisms for extracting water from a web of material, and, more particularly, from a fibrous web being processed into a paper product on a papermaking machine. Specifically, the present invention is a method for manufacturing resin-impregnated endless belt structures designed for use on a long nip press of the shoe type on a papermaking machine, and for other papermaking and paper-processing applications.

2. Description of the Prior Art

During the papermaking process, a fibrous web of cellulosic fibers is formed on a forming fabric by depositing a fibrous slurry thereon in the forming section of a paper machine. A large amount of water is drained from the slurry in the forming section, after which the newly formed web is conducted to a press section. The press section includes a series of press nips, in which the fibrous web is subjected to compressive forces applied to remove water therefrom. The web finally is conducted to a drying section which includes heated dryer drums around which the web is directed. The heated dryer drums reduce the water content of the web to a desirable level through evaporation to yield a paper product.

Rising energy costs have made it increasingly desirable to remove as much water as possible from the web prior to its entry into the dryer section. As the dryer drums are typically heated from within by steam, costs associated with steam production may be substantial, especially when a large amount of water must be removed from the web.

Traditionally, press sections have included a series of nips formed by pairs of adjacent cylindrical press rolls. In recent years, the use of long press nips of the shoe type has been found to be more advantageous than the use of nips formed by pairs of adjacent press rolls. This is because the longer the time a web can be subjected to pressure in the nip, the more water can be removed there, and, consequently, the less water will remain behind in the web for removal through evaporation in the dryer section.

The present invention relates, in part, to long nip presses of the shoe type. In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip, which can be five to ten times longer in the machine direction than one formed between two press rolls, is formed. Since the long nip may be five to ten times longer than that in a conventional two-roll press, the so-called dwell time, during which the fibrous web is under pressure in the long nip, may be correspondingly longer than it would be in a two-roll press. The result is a dramatic increase in the dewatering of the fibrous web in the long nip relative to that obtained using conventional nips on paper machines.

A long nip press of the shoe type requires a special belt, such as that shown in U.S. Pat. No. 5,238,537 to Dutt (Albany International Corp.), the teachings of which are incorporated herein by reference. The belt is designed to protect the press fabric, which supports, carries and dewaters the fibrous web, from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Belts of the variety shown in U.S. Pat. No. 5,238,537 are made by impregnating a woven base fabric, which takes the form of an endless loop, with a synthetic polymeric resin. Preferably, the resin forms a coating of some predetermined thickness on at least the inner surface of the belt, so that the yarns from which the base fabric is woven may be protected from direct contact with the arcuate pressure shoe component of the long nip press. It is specifically this coating which must have a smooth, impervious surface to slide readily over the lubricated shoe and to prevent any of the lubricating oil from penetrating the structure of the belt to contaminate the press fabric, or fabrics, and fibrous web. The base fabric of the belt shown in U.S. Pat. No. 5,238,537 may be woven from monofilament yarns in a single or multilayer weave, and is woven so as to be sufficiently open to allow the impregnating material to totally impregnate the weave. This eliminates the possibility of any voids forming in the final belt. Such voids may allow the lubrication used between the belt and shoe to pass through the belt and contaminate the press fabric or fabrics and fibrous web. The base fabric may be flat-woven, and subsequently seamed into endless form, or woven endless in tubular form.

When the impregnating material is cured to a solid condition, it is primarily bound to the base fabric by a mechanical interlock, wherein the cured impregnating material surrounds the yarns of the base fabric. In addition, there may be some chemical bonding or adhesion between the cured impregnating material and the material of the yarns of the base fabric.

Long nip press belts, such as that shown in U.S. Pat. No. 5,238,537, depending on the size requirements of the long nip presses on which they are installed, have lengths from roughly 10 to 35 feet (approximately 3 to 11 meters), measured longitudinally around their endless-loop forms, and widths from roughly 6 to 35 feet (approximately 2 to 11 meters), measured transversely across those forms. The manufacture of such belts is complicated by the requirement that the base fabric be endless prior to its impregnation with a synthetic polymeric resin.

It is often desirable to provide the belt with a resin coating of some predetermined thickness on its outer surface as well as on its inner surface. By coating both sides of the belt, its woven base fabric will be closer to, if not coincident with, the neutral axis of bending of the belt. In such a circumstance, internal stresses which arise when the belt is flexed on passing around a roll or the like on the paper machine will be less likely to cause the coating to delaminate from either side of the belt.

Moreover, when the outer surface of the belt has a resin coating of some predetermined thickness, it permits grooves, blind-drilled holes or other cavities to be formed on that surface without exposing any part of the woven base fabric. These features provide for the temporary storage of water pressed from the web in the press nip, and are usually produced by grooving or drilling in a separate manufacturing step following the curing of the resin coating.

The present invention provides a solution to this particular problem, that is, the necessity for a separate manufacturing step or steps, which characterizes prior-art methods for manufacturing resin-impregnated endless belt structures having void volume in the form of grooves, blind-drilled holes and the like on their outer surfaces. Moreover, the present invention provides an alternate method for manufacturing resin-impregnated endless belt structures used in other papermaking and paper-processing applications, such as calendar and transfer belts.

SUMMARY OF THE INVENTION

Accordingly, the present invention is a method for manufacturing resin-impregnated endless belt structures designed for use on a long nip press on a papermaking machine and for other papermaking and paper-processing applications. The method comprises a first step of providing a base substrate for the belt. The base substrate may be one which has previously been impregnated with a polymeric resin material which forms a layer on its inner or outer surface.

Alternatively, the base substrate may be rendered impermeable by depositing a polymeric resin material onto the base substrate to coat its entire surface during the practice of the present invention.

Sacrificial material is then deposited onto the base substrate in a precise predetermined pattern, which predetermined pattern is to characterize the surface of the belt being manufactured. The sacrificial material forms a layer of desired thickness over the base substrate to provide a mold there. The sacrificial material is deposited in droplets having an average diameter of 10µ (10 microns) or more. At least one piezojet may be used to deposit the sacrificial material onto the base substrate, although other means for depositing droplets of that size may be known to those of ordinary skill in the art or may be developed in the future and used instead of a piezojet. Subsequently, a functional polymeric resin material is deposited onto the base substrate to cover areas thereof not previously covered by the sacrificial material with a layer of desired thickness, that is, to fill the mold defined by the sacrificial material. The polymeric resin material is then set or fixed by appropriate means.

Finally, the sacrificial material is removed from the belt newly manufactured from the resin-coated substrate. Typically, the sacrificial material is removed through the application of an appropriate solvent or heat. Either before or after the removal of the sacrificial material, the deposited polymeric resin material may optionally be abraded to provide it with a uniform thickness and a smooth, macroscopically monoplanar surface, when desired, or to expose any sacrificial material that may have been covered by the polymeric resin material for subsequent removal.

In one embodiment of the invention, a second functional polymeric resin material is deposited onto the belt newly manufactured from the base substrate to fill the regions formerly occupied by the sacrificial material to render the belt impermeable, if it is not already so, and to provide the belt with surface regions having different properties.

The present invention will now be described in more complete detail, with frequent reference being made to the figures identified below.

DETAILED DESCRIPTION OF THE PREFERRED EMBODIMENTS

Figure 1:
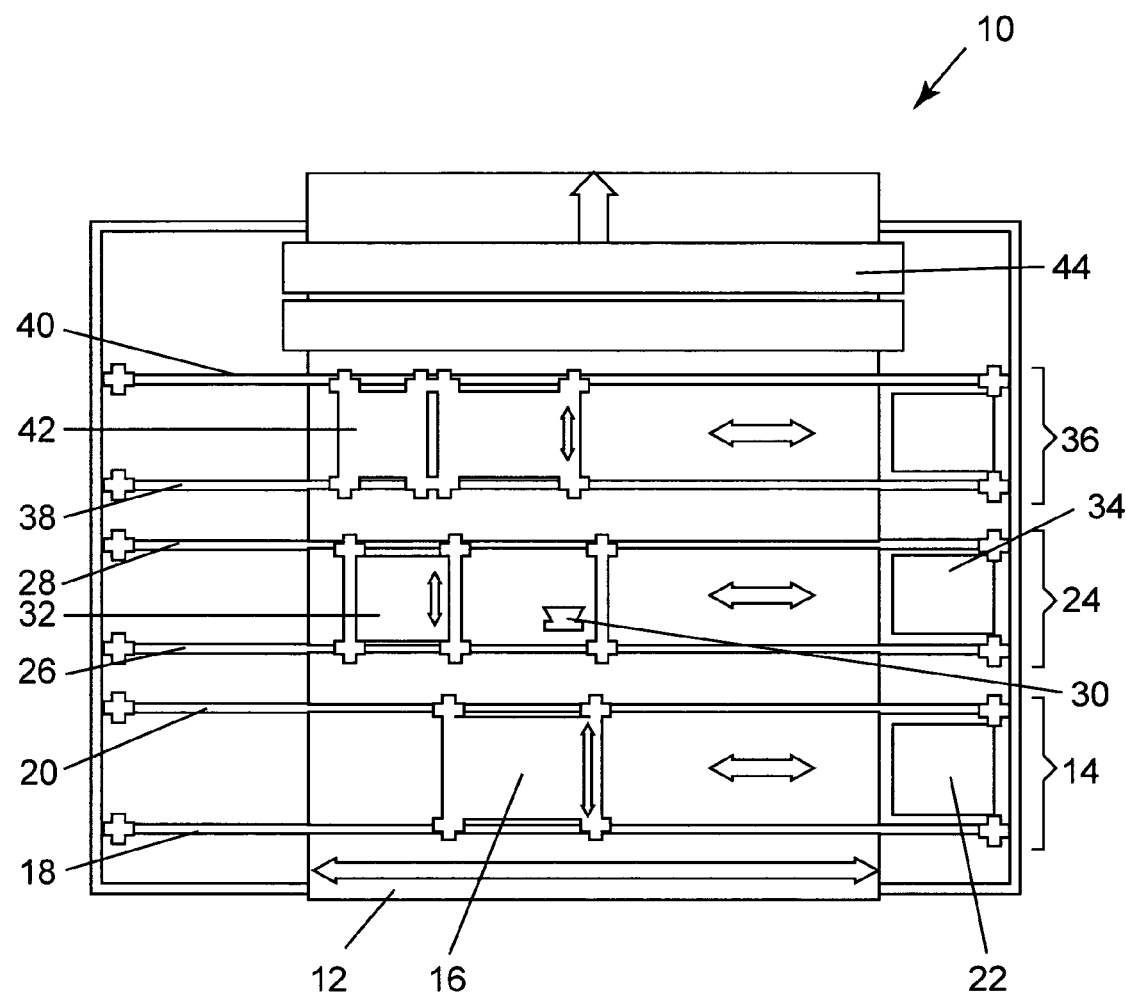
FIG. 1 is a schematic view of an apparatus used to manufacture belts according to the method of the present invention.

The method for fabricating a belt in accordance with the present invention begins with the provision of a base substrate. Typically, the base structure or substrate is a fabric woven from monofilament yarns. More broadly, however, the base substrate may be a woven, nonwoven or knitted fabric comprising yarns of any of the varieties used in the production of paper machine clothing or of belts used to manufacture nonwoven articles and fabrics, such as monofilament, plied monofilament, multifilament and plied multifilament yarns. These yarns may be obtained by extrusion from any of the polymeric resin materials used for this purpose by those of ordinary skill in the art. Accordingly, resins from the families of polyamide, polyester, polyurethane, polyaramid, polyolefin and other resins may be used.

Alternatively, the base substrate may be composed of mesh fabrics, such as those shown in commonly assigned U.S. Pat. No. 4,427,734 to Johnson, the teachings of which are incorporated herein by reference. The base substrate may further be a spiral-link belt of the variety shown in many U.S. patents, such as U.S. Pat. No. 4,567,077 to Gauthier, the teachings of which are also incorporated herein by reference.

Moreover, the base substrate may be produced by spirally winding a strip of woven, nonwoven, knitted or mesh fabric in accordance with the methods shown in commonly assigned U.S. Pat. No. 5,360,656 to Rexfelt et al., the teachings of which are incorporated herein by reference. The base substrate may accordingly comprise a spirally wound strip, wherein each spiral turn is joined to the next by a continuous seam making the base substrate endless in a longitudinal direction.

The above should not be considered to be the only possible forms for the base substrate. Any of the varieties of base substrate used by those of ordinary skill in the paper machine clothing and related arts may alternatively be used.

Once the base substrate has been provided, one or more layers of staple fiber batt may optionally be attached to one or both of its two sides by methods well known to those of ordinary skill in the art. Perhaps the best known and most commonly used method is that of needling, wherein the individual staple fibers in the batt are driven into the base structure by a plurality of reciprocating barbed needles. Alternatively, the individual staple fibers may be attached to the base substrate by hydroentangling, wherein fine high-pressure jets of water perform the same function as the above mentioned reciprocating barbed needles. It will be recognized that, once staple fiber batt has been attached to the base substrate by either of these or other methods known by those of ordinary skill in the art, one would have a structure identical to that of a press fabric of the variety generally used to dewater a wet paper web in the press section of a paper machine.

Alternatively still, the base substrate may be a structure which has been rendered impermeable to fluids, such as air and water, with a coating of a polymeric resin material, which at least partially impregnates the structure and which may form a layer of a desired thickness on one of its two sides. This is particularly the case where the belt is intended for use on a long nip press, and requires a layer of polymeric resin material of some predetermined thickness on its inner surface, so that the base substrate may be protected from direct contact with the arcuate pressure shoe component of the long nip press.

The belts manufactured in accordance with the present invention may be used as long nip press belts for long nip presses of the shoe type, and for other papermaking and paper-processing applications, such as calendering and sheet transfer.

Once the base substrate, with or without the addition of staple fiber batt material, and with or without a layer of polymeric resin material of desired thickness on one of its two sides, has been provided, it is mounted on the apparatus 10 shown schematically in FIG. 1. It should be understood that the base substrate may be either endless or seamable into endless form during installation on a paper machine. As such, the base substrate 12 shown in FIG. 1 should be understood to be a relatively short portion of the entire length of the base substrate 12.

Where the base substrate 12 is endless, it would most practically be mounted about a pair of rolls, not illustrated in the figure but most familiar to those of ordinary skill in the paper machine clothing arts. In such a situation, apparatus 10 would be disposed on one of the two runs, most conveniently the top run, of the base substrate 12 between the two rolls. Whether endless or not, however, the base substrate 12 is preferably placed under an appropriate degree of tension during the process. Moreover, to prevent sagging, the base substrate 12 may be supported from below by a horizontal support member as it moves through apparatus 10.

Referring now more specifically to FIG. 1, where the base substrate 12 is indicated as moving in an upward direction through the apparatus 10 as the method of the present invention is being carried out, apparatus 10 comprises a sequence of several stations through which the base substrate 12 may pass incrementally as a belt is being manufactured therefrom.

The stations are identified as follows:
1. mold element deposition station 14;
2. imaging/repair station 24;
3. polymer deposition station 36;
4. mold element removal station 48; and
5. optional grinding station 50.

In accordance with the present invention, it may first be necessary, where the base substrate has not already been rendered impermeable to fluids, such as air and water, with a coating of a polymeric resin material which at least partially impregnates the base substrate, to coat the entire surface of the base substrate to render the base substrate impermeable. This may be accomplished by using polymer deposition station 36 of apparatus 10 or by other means suitable for the purpose.

In the polymer deposition station 36, transverse rails 38,40 support a metering device, such as a bulk-jet array 42, which is translatable thereon in a direction transverse to that of the motion of the base substrate 12 through the apparatus 10, as well as therebetween in a direction parallel to that of the motion of the base substrate 12, while the latter is at rest. The bulk-jet array 42 may be used to deposit a functional polymeric resin material onto or within the base substrate 12 to render it impermeable and, optionally, to form a layer of desired thickness thereover. One or more passes over the base substrate 12 may be made by the bulk-jet array 42 to deposit the desired amount of polymeric resin material.

Having performed this preliminary step, if necessary, we now turn to the first station. In the first station, the mold element deposition station 14, a piezojet array 16 mounted on transverse rails 18,20 and translatable thereon in a direction transverse to that of the motion of the base substrate 12 through the apparatus 10, as well as therebetween in a direction parallel to that of the motion of the base substrate 12, is used to deposit in repeated steps to build up the desired amount of sacrificial material onto the base substrate 12 in a predetermined pattern. Alternatively, other means for depositing the small droplets required for the practice of the present invention, as will be discussed below, may be known to those of ordinary skill in the art or may be developed in the future, and may be used in the practice of the present invention. In addition the deposit of the sacrificial material need not only be traversing the movement of the base substrate but can be parallel to such movement, spiral to such movement or in any other manner suitable for the purpose.

The sacrificial material may penetrate into the base substrate, if the latter does not already have a layer of functional polymeric resin material covering and rendering it impermeable, and, when desired, forms a layer of desired thickness thereover in the predetermined pattern. That pattern may be an array of discrete locations which are to be the ultimate locations of a corresponding array of discrete holes providing void volume on the surface of the belt. In such a case, the sacrificial material, which is removed later in the belt manufacturing process, and which is not present in a completed belt, is deposited in the discrete locations, where it becomes attached, and may rise to a predetermined height and/or shape above the surface of the base substrate 12. Collectively, the discrete locations having the sacrificial material comprise a mold which is subsequently to be filled by a functional polymeric resin material, so called because it is a functional part of the belt when manufacture has been completed.

Alternatively, the sacrificial material may be deposited in a semicontinuous network, for example, a semicontinuous pattern extending substantially throughout the base substrate 12 in an essentially linear fashion, such that the sacrificial material becomes attached to the base substrate 12 or to the polymeric resin material previously applied to render the base substrate impermeable, along lines which are generally parallel and equally spaced from one another. Such lines may be either curved, straight or zigzag. More generally, a semicontinuous network comprises straight or curved lines, or lines having both straight and curved segments, which are spaced apart from one another and do not cross one another. Ultimately, the semicontinuous network provides the surface of the completed belt with a plurality of grooves, which may provide void volume for the temporary storage of water pressed from a wet paper sheet.

Alternatively still, the sacrificial material may be deposited in a continuous network extending substantially throughout both dimensions of the surface of the base substrate 12 and defining a plurality of discrete open areas in a predetermined array. These discrete open areas are ultimately to be filled by a polymeric resin material and become the ultimate locations of discrete areas, filled by the polymeric resin material, on the surface of the belt. The continuous network may, for example, provide the surface of the completed belt with a plurality of crisscrossing grooves. Note that heretofore grooves were typically cut into the belt. Accordingly they were generally straight or substantially straight due to the cutting actions. Also blind drilled holes were generally circular, again due to the drilling or cutting action. Advantageously, the present invention avoids such limitations in that the voids can be created in any shape desired due to the freedom to deposit the sacrificial material in any pattern to ultimately create the voids.

Referring now to the figures, the piezojet array 16 comprises at least one but preferably a plurality of individual computer-controlled piezojets, each functioning as a pump whose active component is a piezoelectric element. As a practical matter an array of up to 256 piezojets or more may be utilized if, the technology permits. The active component is a crystal or ceramic which is physically deformed by an applied electric signal. This deformation enables the crystal or ceramic to function as a pump, which physically ejects a drop of a liquid material each time an appropriate electric signal is received. As such, this method of using piezojets to supply drops of a desired material repeatedly so as to build up the desired amount of material in the desired shape in response to computer-controlled electric signals is commonly referred to as a "drop-on-demand" method.

The degree of precision of the jet in depositing the material will depend upon the dimensions and shape of the structure being formed. The type of jet used and the viscosity of the material being applied will also impact of the precision of the jet selected.

Referring again to FIG. 1, the piezojet array 16, starting from an edge of the base substrate 12, or, preferably, from a reference thread extending lengthwise therein, translates lengthwise and widthwise across the base substrate 12, while the base substrate 12 is at rest, deposits the sacrificial material in the form of extremely small droplets having a nominal diameter of 10μ (10 microns) or more such as 50μ (50 microns) or 100μ (100 microns), in one of the above-described patterns. The translation of the piezojet array 16 lengthwise and widthwise relative to the base substrate 12, and the deposition of droplets of the sacrificial material from each piezojet in the array 16, are controlled by computer in a controlled manner to produce the predetermined pattern of the sacrificial material in a controlled geometry in three planes, length, width and depth or height (x, y, z dimensions or directions) on the base structure 12. One or more passes over the base substrate 12 may be made by the piezojet array 16 to deposit the desired amount of sacrificial material. That is to say, by depositing the droplets, in a repeating pattern, that being by layering one droplet on top of the next, the height or z-direction of the sacrificial material on the base substrate 12 (or preapplied polymeric resin material) is controlled and may be uniform, varied or otherwise adjusted as desired.

Figure 9:
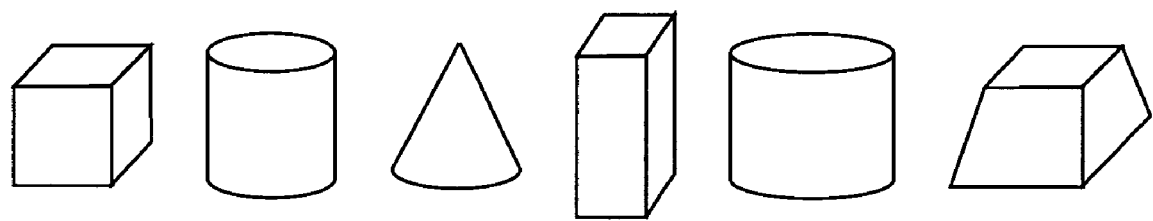
FIG. 9 is a perspective view of a variety of representative shapes of the deposited material.

One or more passes over the base substrate 12 may be made by piezojet array 16 to deposit the desired amount of material and to create the desired shape. In this regard, the deposits can take any number of shapes as illustrated generally in FIG. 9. The shapes can be square, round conical, rectangular, oval, trapezoidal etc. with a thicker base tapering upward. Depending upon the design chosen, the amount of material deposited can be layered in decreasing fashion as the jet repeatedly passes over the deposit area.

When the pattern has been completed in a band between the transverse rails 18,20 across the base substrate 12, the base substrate 12 is advanced lengthwise an amount equal to the width of the band, and the procedure described above is repeated to produce the predetermined pattern in a new band adjacent to that previously completed. In this repetitive manner, the entire base substrate 12 can be provided with the predetermined pattern.

Alternatively, the piezojet array 16, again starting from an edge of the base substrate 12, or, preferably, from a reference thread extending lengthwise therein, is kept in a fixed position relative to the transverse rails 18,20, while the base substrate 12 moves beneath it, to deposit the sacrificial material in the desired pattern in a lengthwise strip around the base substrate 12. Upon completion of the lengthwise strip, the piezojet array 16 is moved widthwise on transverse rails 18,20 an amount equal to the width of the lengthwise strip, and the procedure described above is repeated to produce the predetermined pattern in a new lengthwise strip adjacent to that previously completed. In this repetitive manner, the entire base substrate 12 can be provided with the predetermined pattern.

At one end of the transverse rails 18,20, a jet check station 22 is provided for testing the flow of sacrificial material from each piezojet. There, the jets can be purged and cleaned to restore operation automatically to any malfunctioning jet unit.

The sacrificial material is a solid material which melts quickly upon heating, and sets to bond firmly with the base substrate 12 upon cooling. The sacrificial material may be supplied from a heated reservoir, where it is maintained in a liquid state, and pumped through a feed line to the piezojet or piezojets. The viscosity of the sacrificial material at the point of delivery is important in defining the size and shape of the droplets formed on the base substrate (or the preapplied polymeric resin material) and in time the resolution of the pattern ultimately achieved.

Note the pattern can be random, a repeating random pattern on a base substrate or such patterns that are repeatable from belt to belt for quality control.

The sacrificial material may be a non-aqueous, solvent-removable wax, or a water-soluble wax, such as water-soluble polyethylene glycol or polyvinyl alcohol. More generally, the sacrificial material may be any material which is deliverable though a piezojet in extremely small droplets in the size range given above, and which may ultimately be removed from the base substrate 12 by means not destructive to the base substrate 12 and any functional polymeric resin material thereon. In addition to these requirements, the sacrificial material has to be capable of being fixed or set on the base substrate 12 as quickly as possible following deposition thereon, in order to control its distribution on or in the base substrate 12.

In the second station, the imaging/repair station 24, transverse rails 26,28 support a digital imaging camera 30, which is translatable across the width of base substrate 12, and a repair-jet array 32, which is translatable both across the width of the base substrate 12 and lengthwise relative thereto between transverse rails 26,28, while the base substrate 12 is at rest.

The digital imaging camera 30 views the deposited sacrificial material to locate any faulty or missing discrete mold elements, or similar irregularities in a semicontinuous or continuous pattern produced thereby on the base substrate 12. Comparisons between the actual and desired patterns are made by a fast pattern recognizer (FPR) processor operating in conjunction with the digital imaging camera 30. The FPR processor signals the repair-jet array 32 to deposit additional sacrificial material onto the mold elements detected to be faulty or missing. As before, at one end of the transverse rails 26,28, a repair-jet check station 34 is provided for testing the flow of material from each repair jet. There, each repair jet can be purged and cleaned to restore operation automatically to any malfunctioning repair-jet unit.

In the third station, the polymer deposition station 36 previously discussed, transverse rails 38,40 support a metering device, such as a bulk-jet array 42, which is translatable thereon in a direction transverse to that of the motion of the base substrate 12 through the apparatus 10, as well as therebetween in a direction parallel to that of the motion of the base substrate 12, while the latter is at rest. The bulk-jet array 42 is used to deposit the functional polymeric resin material onto the base substrate 12, except in regions having the sacrificial material, to fill the mold formed by the sacrificial material on the base substrate 12 to form a layer of desired thickness thereover. The latter may be a polyurethane or photosensitive resin, as well as others from the classes to be identified below as being capable of deposition by piezojet array. The bulk-jet array 42 leaves a uniformly thick layer of the functional polymeric resin material, preferably no thicker than the regions of removable material, on the base substrate 12. One or more passes over the base substrate 12 may be made by the bulk jet array 42 to deposit the desired amount of polymeric resin material.

A setting device 44, if required to set or fix the polymeric resin material being used, may also be mounted on the transverse rails 38,40, and follows the bulk-jet array 42 across the base substrate 12 to set or fix the material deposited thereby. The setting device 44 may be a heat source, for example, an infrared, hot air, microwave or laser source; cold air; or an ultraviolet or visible light source, the choice being governed by the requirements of the polymeric resin material being used.

It should be understood that the functional polymeric resin material also needs to be fixed on the base substrate 12 following its deposition thereon. The means by which the functional polymeric resin material is set or fixed depends on its own physical and/or chemical requirements. Photopolymers are cured with light, whereas hot-melt materials are set by cooling. Aqueous-based latexes and dispersions are dried and then cured with heat, and reactive systems are cured by heat. Accordingly, the functional polymeric resin materials may be set by curing, cooling, drying, or any combination thereof.

Again, at one end of the transverse rails 38,40, a bulk-jet check station 46 is provided for testing the flow of material from each bulk jet. There, each bulk jet can be purged and cleaned to restore operation automatically to any malfunctioning bulk-jet unit.

Alternatively, the polymeric resin material may be deposited onto or within the base substrate 12 (or preapplied polymeric material as aforenoted) by spraying, blade coating, single-pass-spiral (SPS) coating, multiple-thin-pass (MTP) coating, or any other methods known in the art to apply a liquid material to a textile substrate.

The fourth station is the mold element removal station 48. Here, the sacrificial material, originally deposited in the mold element deposition station 14, is removed by appropriate means. For example, if the sacrificial material is a wax, the mold removal station 48 may include a heat source of appropriate temperature to melt the wax and enable it to flow from the base substrate 12. If, on the other hand, the sacrificial material is a solvent-removable material, the mold element removal station 48 would provide a treatment, such as by spraying or immersion, with an appropriate solvent, such as water. In practice, the base substrate 12 may be directed in a serpentine path in and out of a solvent bath to allow it to be showered for more efficient removal of the sacrificial material. Alternatively, the serpentine path may be entirely within an agitated solvent bath. By increasing the temperature of the bath, the removal of the sacrificial material may proceed even more efficiently.

In any event, the removal of the sacrificial material is carried out by a means not destructive to the base substrate 12 and the functional polymeric resin material thereon, and leaves the base substrate 12 with the functional resin in the pattern desired.

At this point, it may be desirable in some applications to fill the regions formerly having the sacrificial material with a functional polymeric resin material which is different from that applied above to fill the mold previously formed by the sacrificial material on the base substrate 12. Note by doing so, this may eliminate the need to preapply a polymer resin material to render the base substrate impermeable since by filling the openings formed by the sacrificial material should in and of itself, render the belt impermeable.

If the functional polymeric resin material used first is a hydrophilic material, it may be desirable to apply a hydrophobic functional polymeric resin material to fill the regions formerly occupied by the sacrificial material to provide a belt with a uniform thickness having both hydrophilic and hydrophobic regions on its surface. Such a belt may subsequently be used as a sheet-transfer belt. Polymer deposition station 36 may be used to apply the second functional polymeric resin material in the regions formerly occupied by the sacrificial material.

Finally, the optional fifth and last station is grinding station 50, where an appropriate abrasive is used to provide the polymeric resin material with a uniform thickness and a smooth, macroscopically monoplanar surface. It should be understood that the grinding station 50 may alternatively be disposed before the mold element removal station 48 to expose any sacrificial material that may be covered by the polymeric resin material. In any case, the optional grinding station 50 may comprise a roll having an abrasive surface, and another roll or backing surface on the other side of the base substrate 12 to ensure that the grinding will result in a uniform thickness and a smooth, macroscopically monoplanar surface.

Figure 2:
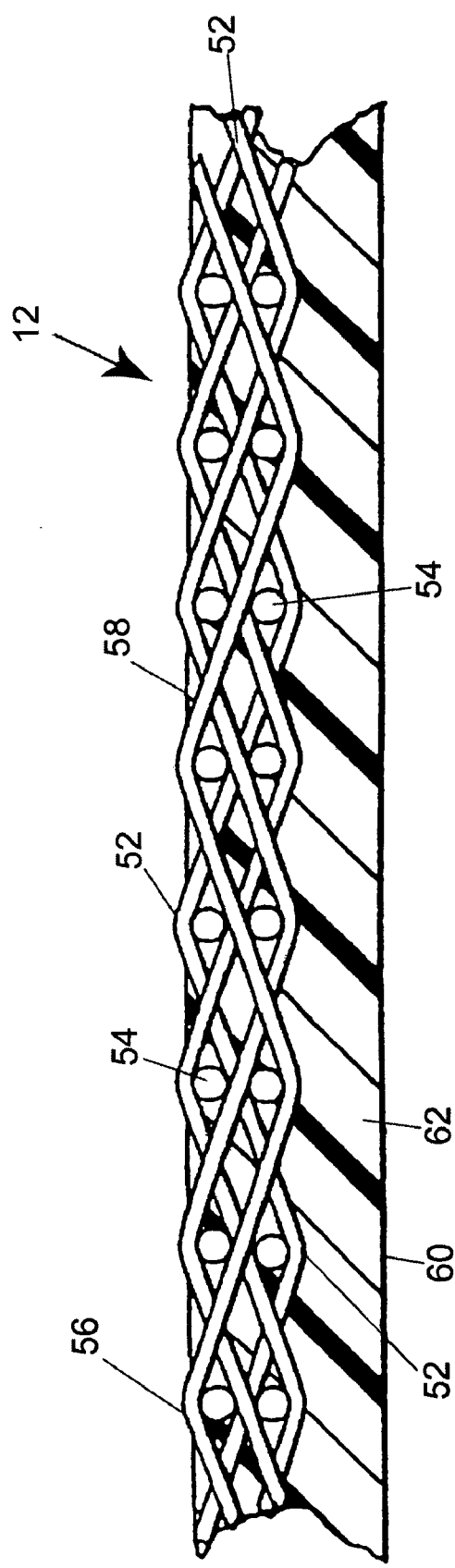
FIG. 2 is a cross-sectional view of a base substrate having a layer of polymeric resin material on its inner surface.

As an example, reference is now made to FIG. 2, which is a cross-sectional view of a base substrate 12 having a layer of polymeric resin material on its inner surface. Such a base substrate 12 is used where a long nip press belt is to be manufactured. The base substrate 12 is woven from lengthwise yarns 52 and crosswise yarns 54 in a multilayer weave. Knuckles 56 appearing on the surface of the base substrate 12 where lengthwise yarns 52 weave over crosswise yarns 54 may be visible on the outer surface 58 of the base substrate 12. The inner surface 60 of the base substrate 12 is formed by a polymeric resin coating 62.

The polymeric resin coating 62 protects the base substrate 12 from sliding contact and the wear by abrasion that would result when the inner surface 60 slides across a lubricated arcuate pressure shoe of a long nip press. The polymeric resin also impregnates the base substrate 12 rendering it impermeable to oil and water. The polymeric resin coating 62 may be of polyurethane, and is preferably a 100% solids composition thereof to avoid the formation of bubbles during the curing process through which the polymeric resin proceeds following its application onto the base substrate 12. After curing, the polymeric resin coating 62 can be ground and buffed to provide it with a smooth surface and a uniform thickness.

Figure 3:
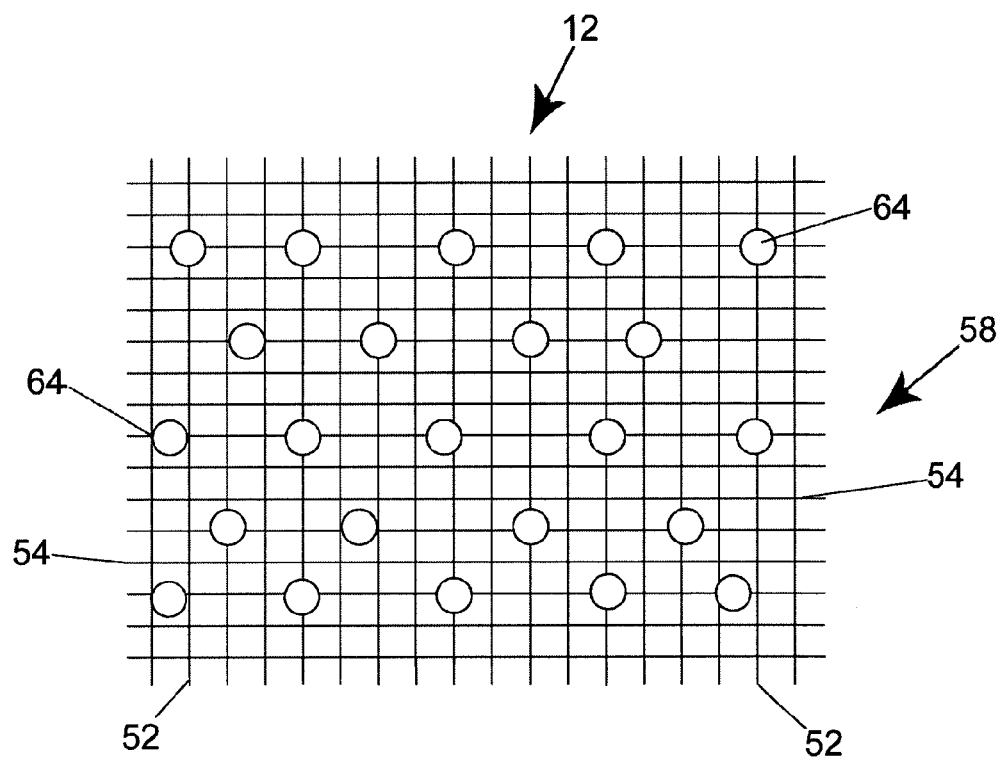
FIG. 3 is a plan view of the base substrate as it would appear upon exit from the imaging/repair station in the apparatus of FIG. 1.

FIG. 3 is a plan view of the base substrate 12 as it would appear upon exit from imaging/repair station 24. As such, the outer surface 58 of the base substrate 12 includes a plurality of mold elements 64 of sacrificial material set forth in a predetermined pattern taking the form of an array of discrete locations which are to be the ultimate locations of a corresponding array of discrete holes providing void volume on the surface of the belt being manufactured.

Figure 4:
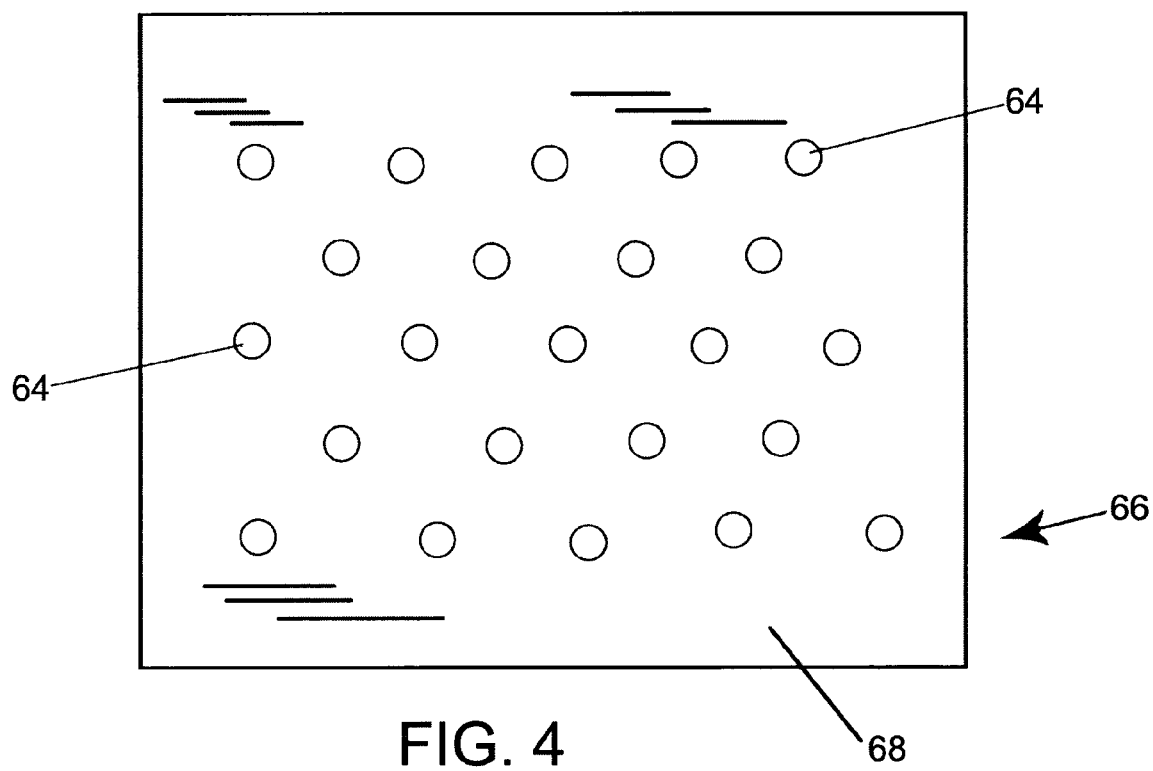
FIG. 4 is a plan view of the base substrate as it would appear upon exit from the polymer deposition station in the apparatus of FIG. 1.

FIG. 4 is a plan view of base substrate 12 as it would appear upon exit from polymer deposition station 36. At this point, the base substrate 12 may properly be referred to as an intermediate belt product 66, implying that the belt is depicted at an intermediate stage in its manufacture. Polymeric resin material 68 covers the base substrate 12 except for the locations occupied by the mold elements 64 of sacrificial material.

Figure 5:
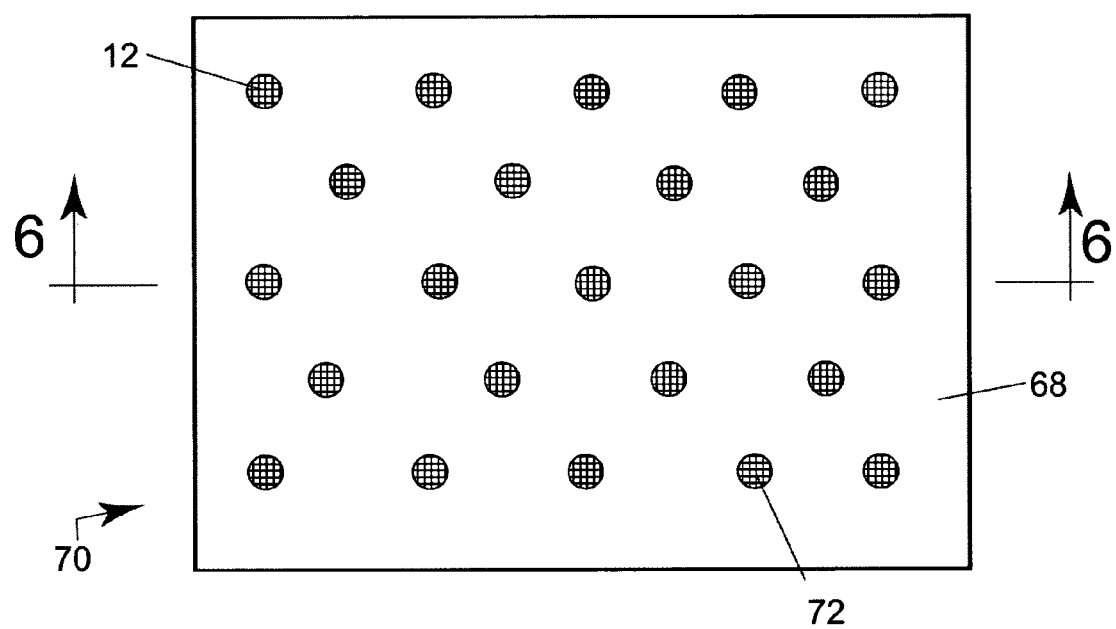
FIG. 5 is a plan view of a completed belt as it would appear upon exit from the mold removal station and grinding station of the apparatus of FIG. 1.

FIG. 5 is a plan view of a completed belt 70 as it would appear upon exit from mold elements removal station 48 and grinding station 50. The belt 70 includes functional polymeric resin material 68 except at those locations formerly occupied by mold elements 64 of sacrificial material, whose removal leaves the polymeric resin material 68 with a plurality of discrete holes 72 in a predetermined pattern.

Figure 6:
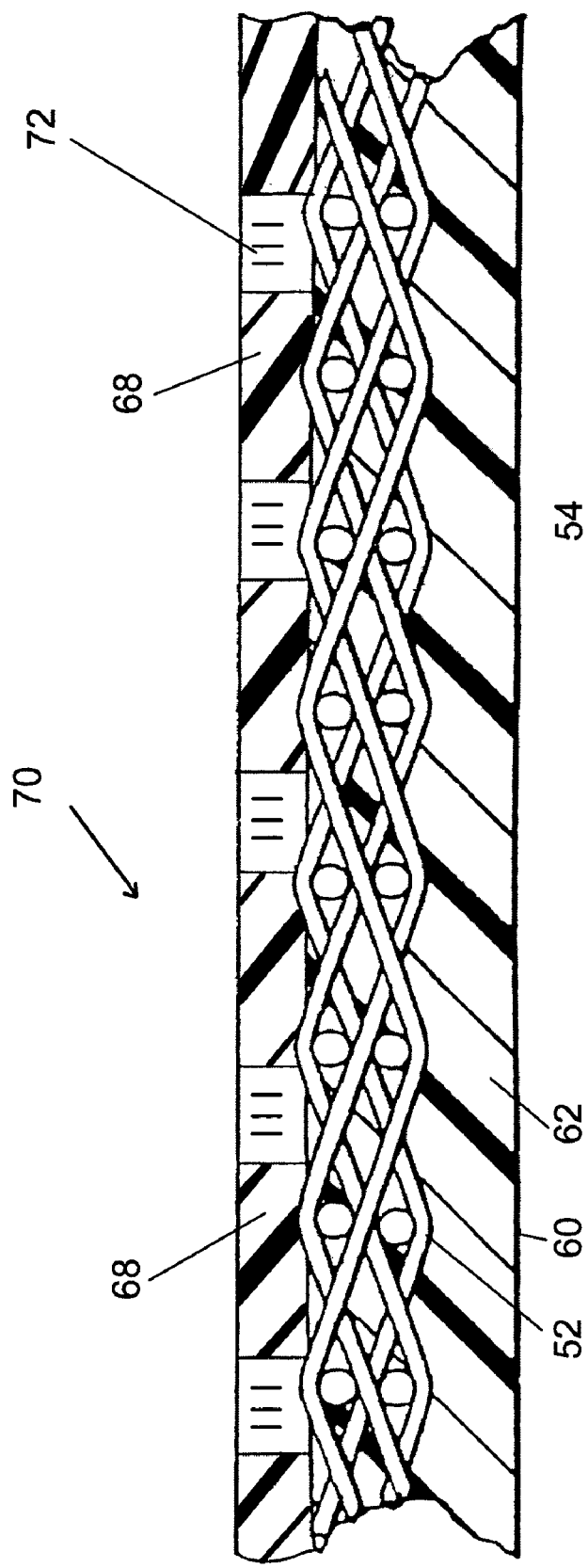
FIG. 6 is a cross-sectional view taken as indicated in FIG. 5.

FIG. 6 is a cross-sectional view of a completed belt 70 taken as indicated in FIG. 5. In this example, polymeric resin material 68 forms a layer of desired thickness over the base substrate 12, except for the areas represented by the discrete holes 72.

Figure 7:
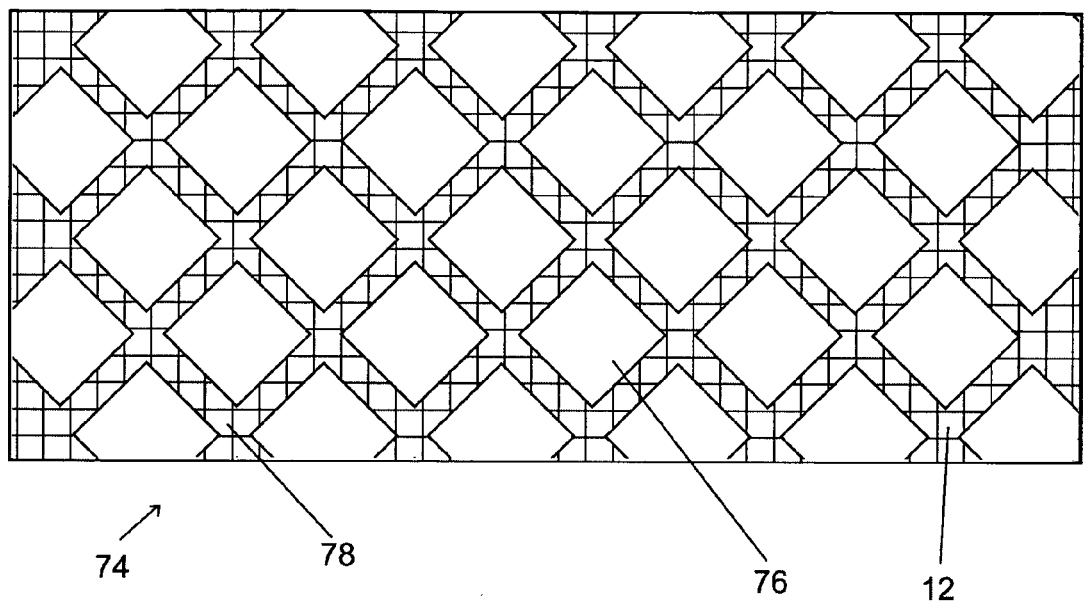
FIG. 7 is a plan view of a second embodiment of the belt.
Figure 8:
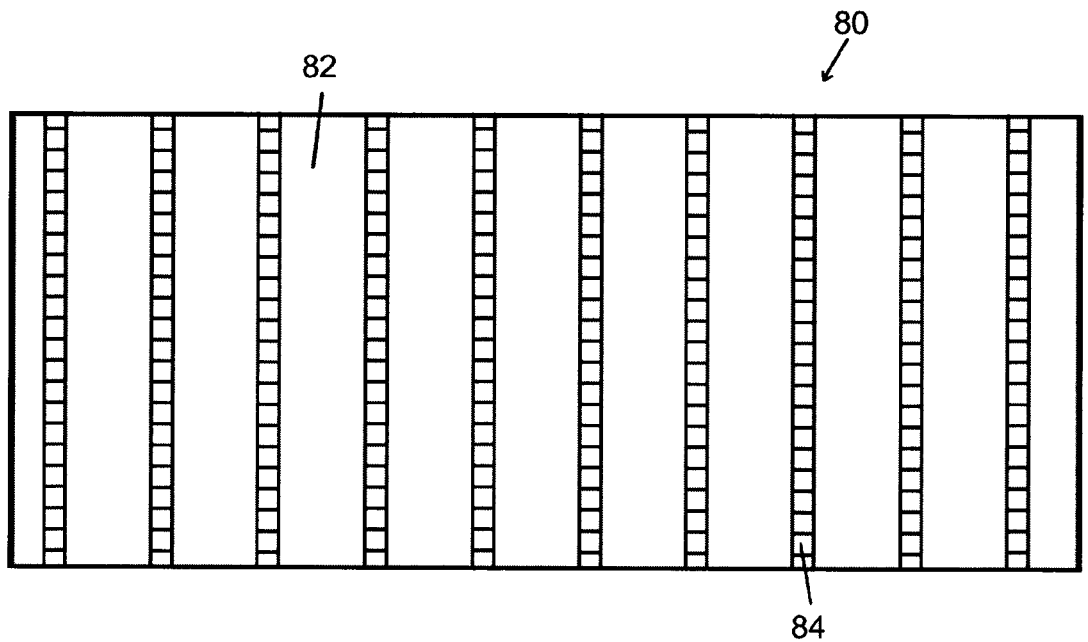
FIG. 8 is a plan view of a third embodiment of the belt.

Alternative embodiments of the belt are shown in FIGS. 7 and 8. FIG. 7 is a plan view of a belt 74 whose base substrate 12 has a plurality of discrete areas 76 of polymeric resin material in a predetermined array on its outer surface providing the surface of the belt 74 with a plurality of crisscrossing grooves 78.

FIG. 8 is a plan view of a belt 80 having a semicontinuous network of polymeric resin material on its surface. The semicontinuous network extends substantially throughout the belt 80 in an essentially linear fashion. Each portion 82 of the semicontinuous network extends in a substantially straight line parallel to others making up the network. Each portion 82 is of polymeric resin material, and is a land area which with portions 82 adjacent thereto define grooves 84 therebetween. The land areas may also have nonparallel walls and avarying cross-section therethrough such as trapezoidal.

In an alternate embodiment of the present invention, the mold element deposition station 14, the imaging/repair station 24, and the polymer deposition station 36 may be adapted to produce a belt from the base substrate 12 in a spiral technique, rather than by indexing in the cross-machine direction as described above. In a spiral technique, the mold element deposition station 14, the imaging/repair station 24, and the polymer deposition station 36 start at one edge of the base substrate 12, for example, the left-hand edge in FIG. 1, and are gradually moved across the base substrate 12, as the base substrate 12 moves in the direction indicated in FIG. 1. The rates at which the stations 14,24,36 and the base substrate 12 are moved are set so that the pattern desired in the finished belt is spiraled onto the base substrate 12 in a continuous manner. In this alternative, the polymeric resin material deposited by the polymer deposition station 36 may be partially set or fixed as each spiral passes beneath the setting device 44, and completely set when the entire base substrate 12 has been processed through apparatus 10.

Alternatively, where the piezojet array 16 deposits the sacrificial material in the desired pattern in a lengthwise strip around the base substrate 12, the imaging/repair station 24 and the polymer deposition station 36 may also be kept in a fixed position aligned with the piezojet array 16, while the base substrate 12 moves beneath them, so that the pattern desired in the finished belt is applied to a lengthwise strip around the base substrate 12. Upon completion of the lengthwise strip, the piezojet array 16, the imaging/repair station 24 and the polymer deposition station 36 are moved widthwise in an amount equal to the width of the lengthwise strip, and the procedure is repeated for a new lengthwise strip adjacent to that previously completed. In this repetitive manner, the entire base substrate 12 can be completely processed into a belt.

Furthermore, the entire apparatus can remain in a fixed position with the material processed. It should be noted that the material need not be a full width belt but can be a strip of material such as that disclosed in U.S. Pat. No. 5,360,656 to Rexfelt, the disclosure of which is incorporated herein by reference, and subsequently formed into a full width belt. The strip can be unwound and wound up on a set of rolls after fully processing. These rolls of belting materials can be stored and can then be used to form an endless full width structure using, for example, the teachings of the immediately aforementioned patent.

Properties of the functional polymeric resin material, such as its resistance to wear and to oxidation, are important for the durability of the belt. In addition to the importance of the curing, setting or reaction times of the functional polymeric resin material, as discussed above, the viscosity of the resin material during delivery to the belt may also be important as aforesaid. Specifically, in another embodiment of the present invention, the polymer deposition station 36 comprises a second piezojet array, instead of a bulk-jet array 42. Where a piezojet array is used to deposit polymeric resin onto or within the base substrate 12, except in regions filled with sacrificial material, the choice of polymeric resin material is limited by the requirement that its viscosity be 100 cps (100 centipoise) or less at the time of delivery, that is, when the polymeric resin material is in the nozzle of a piezojet ready for deposition, so that the individual piezojets can provide the polymeric resin material at a constant drop delivery rate.

Polymeric resin materials which may be applied either by piezojet array or by bulk-jet array include those in the following four classes:

1. Hot melts and moisture-cured hot melts;
2. Two-part reactive systems based on urethanes and epoxies;
3. Photopolymer compositions consisting of reactive acrylated-monomers and acrylated oligomers derived from urethanes, polyesters, polyethers, and silicones: and
4. Aqueous-based latexes and dispersions and particle-filled formulations including acrylics and polyurethanes.

As noted above, a piezojet array is capable of supplying the polymeric resin material in the form of extremely small droplets having an average diameter of 10µ (10 microns) or more, so long as its viscosity is less than 100 cps (100 centipoise) at the time of delivery. Moreover, the piezojet array can deposit the polymeric resin material with great precision one layer at a time, making it unnecessary to grind the surface of the coating formed thereby to achieve a uniform thickness, and enables one of ordinary skill in the art to control the z-direction geometry of the coating. That is to say, the piezojet array can deposit the polymeric resin material with such precision that the surface will be monoplanar without having to be ground or, alternatively, that the surface will have some predetermined three-dimensional structure. Further, in this embodiment, some of the individual piezojets in the piezojet array may be used to deposit one polymeric resin material, such as a hydrophilic polymeric resin material, while others may be used to deposit a different polymeric resin material, such as a hydrophobic polymeric resin material, to produce a surface having microregions of more than one type of polymeric resin material.

Modifications to the above would be obvious to those of ordinary skill in the art, but would not bring the invention so modified beyond the scope of the appended claims. In particular, while piezojets are disclosed above as being used to deposit the sacrificial material, and possibly the functional polymeric resin material, in preselected locations on the base substrate, other means for depositing droplets thereof in the size range desired may be known to those of ordinary skill in the art or may be developed in the future, and such other means may be used in the practice of the present invention. For example, in processes requiring a relatively larger scale pattern such that the final elements such as round hemispheres, a relatively large, even a single resin deposition nozzle can comprise the entire jet array. The use of such means would not bring the invention, if practiced therewith, beyond the scope of the appended claims.

What is claimed is:

1. A method for manufacturing resin impregnated endless belt structures, designed for use on a long nip press on a papermaking machine and for other papermaking and paper processing applications, said method comprising the steps of:
   a) providing a base substrate for the belt;
   b) depositing sacrificial material onto said base substrate in a controlled manner so as to control the x, y, z dimensions of the material deposited to create a predetermined pattern of deposits, wherein each deposit comprises one or more droplets of sacrificial material and wherein said predetermined pattern creates a surface of said belt structures providing a functional aspect thereto;
   c) depositing a functional polymeric resin material onto said base substrate to cover areas thereof not having said sacrificial material;
   d) at least partially setting said functional polymeric resin material; and
   e) removing the sacrificial material from said base substrate.

2. A method as claimed in claim 1 wherein said sacrificial material is deposited in droplets having a nominal diameter of 10µ (10 microns) or more.

3. A method as claimed in claim 1 wherein steps b) through e) are performed sequentially on successive bands extending widthwise across said base substrate.

4. A method as claimed in claim 1 wherein steps b) through e) are performed sequentially on successive strips extending lengthwise around said base substrate.

5. A method as claimed in claim 1 wherein steps b) through e) are performed spirally around said base substrate.

6. A method as claimed in claim 1 wherein, in step b), said predetermined pattern comprises a plurality of discrete locations set forth in a predetermined array.

7. A method as claimed in claim 1 wherein, in step b), said predetermined pattern comprises a continuous network defining a plurality of discrete open areas in a predetermined array.

8. A method as claimed in claim 1 wherein, in step b), said predetermined pattern comprises a semicontinuous network extending substantially throughout said base substrate.

9. A method as claimed in claim 1 wherein, in step b), said sacrificial material forms a uniform or random pattern layer of desired thickness over said base substrate in said predetermined pattern.

10. A method as claimed in claim 1 wherein, in step b), said sacrificial material is deposited by a piezojet array comprising at least one individual computer controlled piezojet.

11. A method as claimed in claim 1 wherein said sacrificial material is a wax removable by heating.

12. A method as claimed in claim 1 wherein said sacrificial material is a solvent removable material.

13. A method as claimed in claim 1 further comprising, between steps b) and c), the steps of:
   i) checking the actual pattern of said sacrificial material to measure conformity to said predetermined pattern; and
   ii) repairing said actual pattern of said sacrificial material to eliminate departures from said predetermined pattern.

14. A method as claimed in claim 13 wherein said checking step is performed by a fast pattern recognizer (FPR) processor operating in conjunction with a digital imaging camera.

15. A method as claimed in claim 14 wherein said repairing step is performed by a repair jet array coupled to said FPR processor.

16. A method as claimed in claim 1 wherein, in step c), said functional polymeric resin material forms a layer of desired thickness over said base substrate.

17. A method as claimed in claim 1, wherein said functional polymeric resin material is polyurethane.

18. A method as claimed in claim 1 wherein said functional polymeric resin material is a photosensitive resin.

19. A method as claimed in claim 18 wherein said setting step is performed by exposing said photosensitive resin to actinic radiation.

20. A method as claimed in claim 1 wherein said setting step is performed by exposing said functional polymeric resin material to a heat source.

21. A method as claimed in claim 1 wherein said setting step is performed by exposing said functional polymeric resin material to cold air.

22. A method as claimed in claim 1 wherein said setting step is performed by exposing said functional polymeric material to actinic radiation.

23. A method as claimed in claim 1 wherein said functional polymeric resin material is selected from the group consisting of:
   1. hot melts and moisture cured hot melts;
   2. two part reactive systems based on urethanes and epoxies;
   3. photopolymer compositions consisting of reactive acrylated monomers and acrylated oligomers derived from urethanes, polyesters, polyethers, and silicones; and
   4. aqueous based latexes and dispersions and particle filled formulations including acrylics and polyurethanes.

24. A method as claimed in claim 1 wherein said removing step is performed by heating.

25. A method as claimed in claim 1 wherein said removing step is performed by the action of an appropriate solvent.

26. A method as claimed in claim 1 further comprising, between steps a) and b), the step of depositing a polymeric resin material onto said base substrate to coat the entire surface thereof and to render said base substrate impermeable.

27. A method as claimed in claim 26 wherein said polymeric resin material is deposited onto said base substrate by a bulk jet array.

28. A method as claimed in claim 1 which includes the step of providing a base substrate taken from the group consisting essentially of woven, nonwoven, spiral formed, spiral-link, knitted, mesh or strips of material which are ultimately wound to form a belt having a width greater than a width of the strips.

29. A method as claimed in claim 26 wherein said polymeric resin material is deposited by a piezojet array comprising at least one individual computer controlled piezojet.

30. A method as claimed in claim 26 wherein said polymeric resin material is deposited by spraying.

31. A method as claimed in claim 26 wherein said polymeric resin material is deposited onto said base substrate by blade coating.

32. A method as claimed in claim 26 wherein said polymeric resin material is deposited onto said base substrate by single pass spiral (SPS) coating.

33. A method as claimed in claim 26 wherein said polymeric resin material is deposited onto said base substrate by multiple thin pass (MTP) coating.

34. A method as claimed in claim 1 wherein, in step c), said functional polymeric resin material is deposited onto said base substrate by a bulk jet array.

35. A method as claimed in claim 26 wherein said functional polymeric resin material is deposited by a piezojet array comprising at least one individual computer controlled piezojet.

36. A method as claimed in claim 1 wherein, in step c), said functional polymeric resin material is deposited by spraying.

37. A method as claimed in claim 1 wherein, in step c), said functional polymeric resin material is deposited onto said base substrate by blade coating.

38. A method as claimed in claim 1 wherein, in step c), said functional polymeric resin material is deposited onto said base substrate by single pass spiral (SPS) coating.

39. A method as claimed in claim 1 wherein, in step c), said functional polymeric resin material is deposited onto said base substrate by multiple thin pass (MTP) coating.

40. A method as claimed in claim 1 wherein a first functional polymeric resin material is deposited and a second functional polymeric resin material is deposited which is different from the first functional polymeric resin material.

41. A method as claimed in claim 40 wherein one polymeric resin material is hydrophilic and the other polymeric resin material is hydrophobic.

42. A method as claimed in claim 40 wherein said base substrate is impregnated with a polymeric resin material rendering it impermeable prior to depositing said sacrificial material and said functional polymeric resin material.

43. A method as claimed in claim 26 wherein said polymeric resin material is deposited onto said base substrate in a uniform layer having a monoplanar surface or a nonuniform thick layer having a surface with a three dimensional structure.

44. A method as claimed in claim 40 further comprising, after step e), the step of depositing the second functional polymeric resin material onto said base substrate to cover and fill areas formerly covered by said sacrificial material.

45. A method as claimed in claim 44 wherein one said functional polymeric resin material is hydrophilic and the other is hydrophobic.

46. A method as claimed in claim 1 further comprising the optional step of abrading said functional polymeric resin material on said base substrate to provide said functional polymeric resin material with a uniform thickness and a smooth, macroscopically monoplanar surface.

47. A resin-impregnated endless belt structure, designed for use on a long nip press on a papermaking machine and for other papermaking and paper processing applications, said belt comprising:

a base substrate;

a polymeric resin coating deposited on said base substrate; and a pattern of x, y, and z dimensionally controlled voids, formed in the polymeric resin coating by the removal of sacrificial material, wherein the belt is made in a manner comprising the steps of:

a) providing a base substrate for the belt;

b) depositing sacrificial material onto said base substrate in a controlled manner so as to control the x, y, z dimensions of the material to create a predetermined pattern of deposits, wherein each deposit comprises one or more droplets of sacrificial material and wherein said predetermined pattern creates a surface of said belt structures providing a functional aspect thereto;

c) depositing a functional polymeric resin material onto said base substrate to cover areas thereof not having said sacrificial material;

d) at least partially setting said functional polymeric resin material; and e) removing the sacrificial material from said base substrate.

48. A belt structure as claimed in claim 47 wherein said sacrificial material is deposited in droplets having a nominal diameter of 10μ (10 microns) or more.

49. A belt structure as claimed in claim 47 further comprising the optional step of abrading said functional polymeric resin material on said base substrate to provide said functional polymeric resin material with a uniform thickness and a smooth, macroscopically monoplanar surface.

50. A belt structure as claimed in claim 47 wherein steps b) through e) are preformed sequentially on successive bands extending widthwise across said base substrate.

51. A belt structure as claimed in claim 47 wherein steps b) through e) are performed sequentially on successive strips extending lengthwise around said base substrate.

52. A belt structure as claimed in claim 47 wherein steps b) through e) are performed spirally around said base structure.

53. A belt structure as claimed in claim 47 wherein, in step b), said predetermined pattern comprises a plurality of discrete locations set forth in a predetermined array.

54. A belt structure as claimed in claim 47 wherein, in step b), said predetermined pattern comprises a continuous network defining a plurality of discrete open areas in a predetermined array.

55. A belt structure as claimed in claim 47 wherein, in step b), said predetermined pattern comprises a semicontinuous network extending substantially throughout said base substrate.

56. A belt structure as claimed in claim 47 wherein, in step b), said sacrificial material forms a uniform or random pattern layer of desired thickness over said base substrate in said predetermined pattern.

57. A belt structure as claimed in claim 47 wherein in step b), said sacrificial material is deposited by piezojet array comprising at least one individual computer-controlled piezojet.

58. A belt structure as claimed in claim 47 wherein said sacrificial material is a wax removable by heating.

59. A belt structure as claimed in claim 47 wherein said sacrificial material is a solvent-removable material.

60. A belt structure as claimed in claim 47 wherein said functional polymeric resin material is selected from the group consisting of:
1. hot melts and moisture-cured hot melts;
2. two-part reactive systems based on urethanes and epoxies;
3. photopolymer compositions consisting of reactive acrylated monomers and acrylated oligomers derived from urethanes, polyesters, polyethers, and silicones; and
4. aqueous-based latexes and dispersions and particle-filled formulations including acrylics and polyurethanes.

61. A belt structure as claimed in claim 47 further comprising, between steps a) and b), the step of depositing a polymeric resin material onto said base substrate to coat the entire surface thereof and to render said base substrate impermeable.

62. A belt structure as claimed in claim 61 wherein said polymeric resin material is deposited onto said base substrate by a bulk-jet array.

63. A belt structure as claimed in claim 61 wherein said polymeric resin material is deposited by spraying.

64. A belt structure as claimed in claim 61 wherein said polymeric resin material is deposited onto said base substrate by blade coating.

65. A belt structure as claimed in claim 61 wherein said polymeric resin material is deposited onto said base substrate by single-pass-spiral (SPS) coating.

66. A belt structure as claimed in claim 61 wherein said polymeric resin material is deposited onto said base substrate by multiple-thin-pass (MTP) coating.

67. A belt structure as claimed in claim 61 wherein said functional polymeric resin material is deposited by a piezojet array comprising at least one individual computer-controlled piezojet.

68. A belt structure as claimed in claim 47 wherein a first functional polymeric resin material is deposited and a second functional polymeric resin material is deposited which is different from the first.

69. A belt structure as claimed in claim 67 wherein said functional polymeric resin material is deposited onto said base fabric in a uniform thick layer having a monoplanar surface, or a nonuniformly thick layer having a surface with a three-dimensional structure.

70. A belt structure as claimed in claim 60 further comprising, between steps a) and b), the step of depositing a polymeric resin material onto said base substrate to coat the entire surface thereof and to render said base substrate impermeable.

71. A belt structure as claimed in claim 68 further comprising, after step e), the step of depositing the second functional polymeric resin material onto said base substrate to cover and fill areas formerly covered by said sacrificial material.

72. A belt structure as claimed in claim 47 further comprising the step of providing a base substrate taken from the group consisting essentially of woven, nonwoven, spiral formed, spiral-link, knitted, mesh or strips of material which are ultimately spiral wound to form a belt having a width greater than a width of the strips.

73. A belt structure as claimed in claim 47 wherein the predetermined pattern creates a semicontinuous network of parallel grooves.

74. A belt structure as claimed in claim 47 wherein the predetermined pattern creates a continuous network of criss-cross grooves.

\* \* \* \* \*